Aug. 31, 1943. R. H. KIENLE ET AL 2,328,461
CONTINUOUS RECORDER FOR COLOR CHANGES
Original Filed Aug. 29, 1940 4 Sheets-Sheet 4

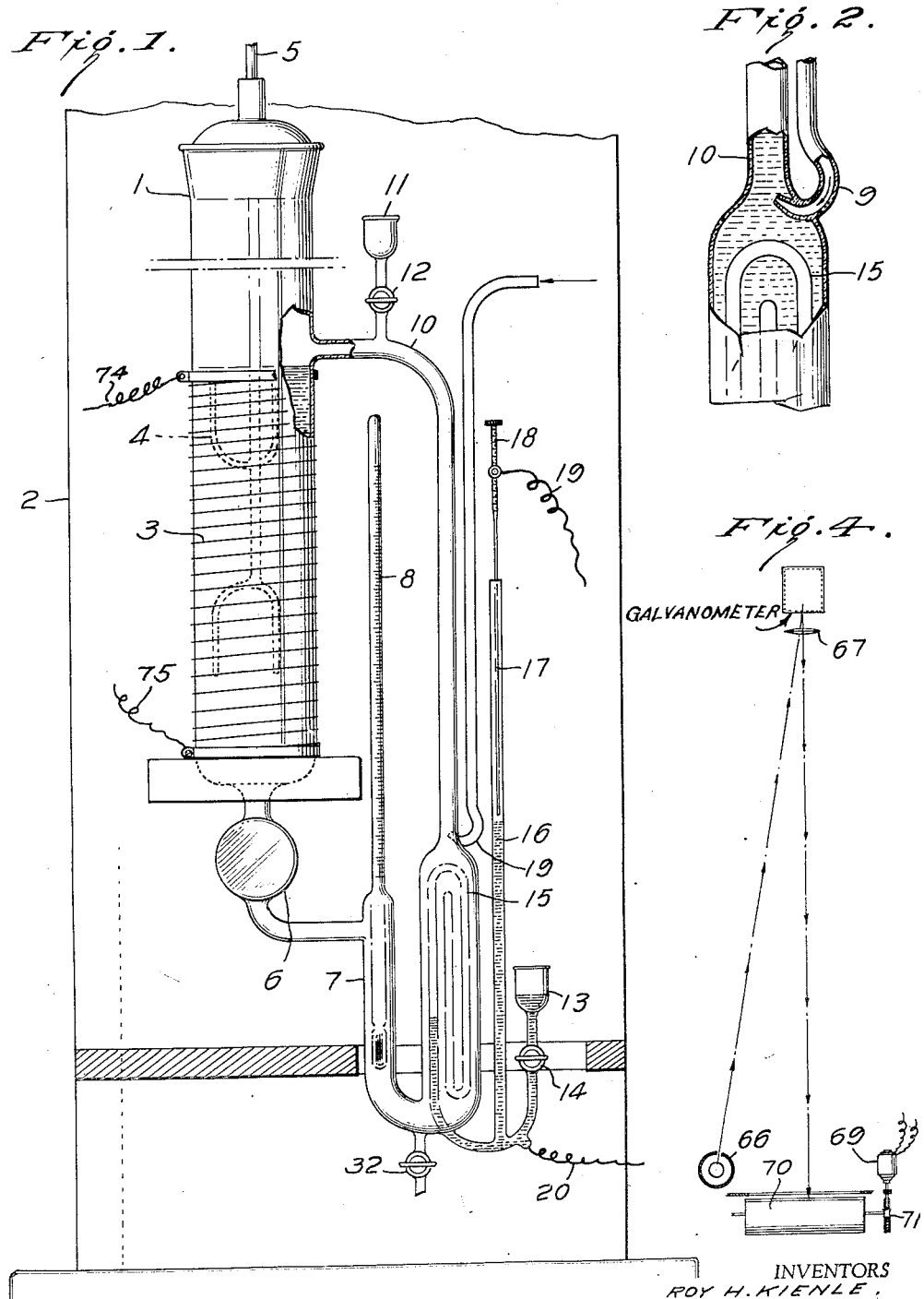

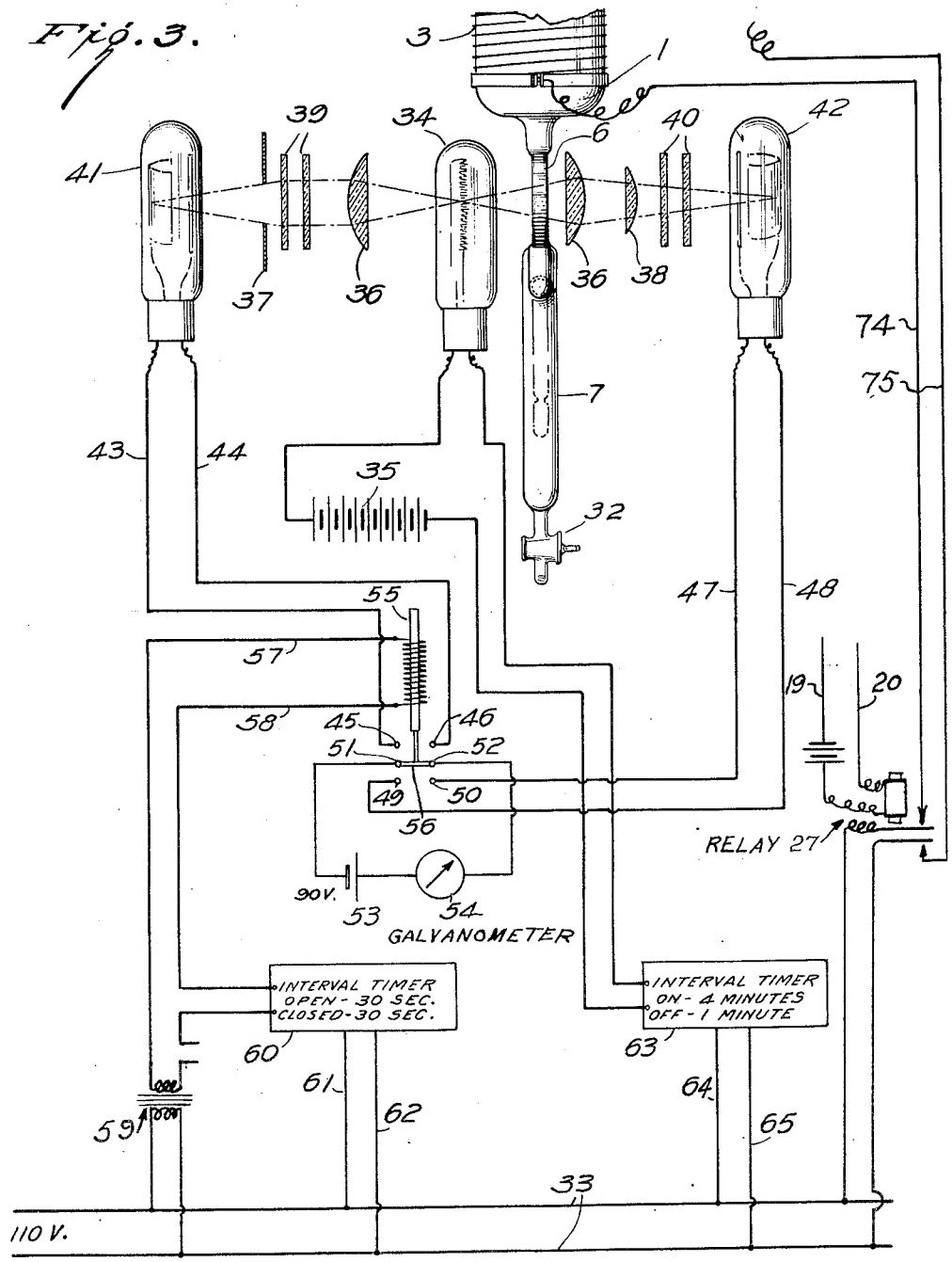

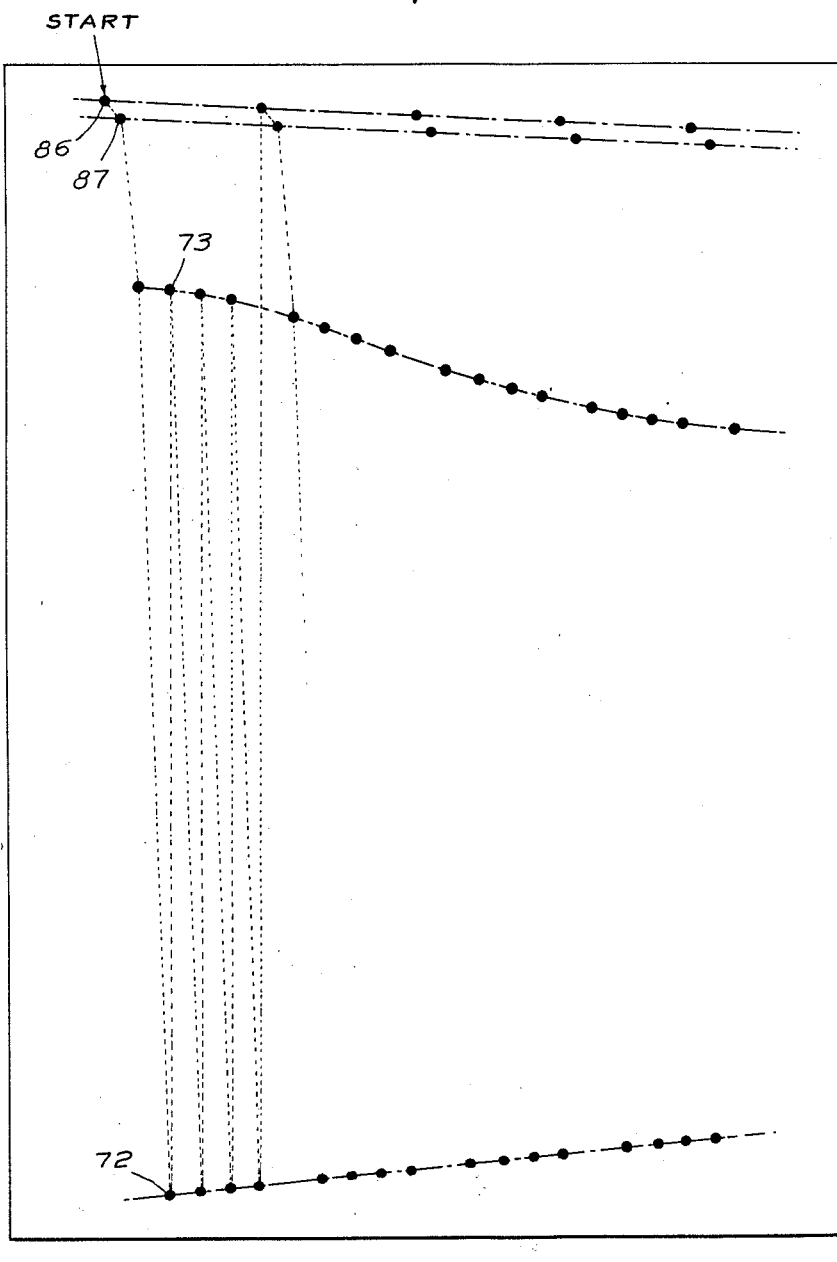

INVENTORS
ROY H. KIENLE,
ROBERT H. PARK,
BY CHARLES H. BENBROOK,
EVERETT F. GRIEB
Robert Ames Norton
ATTORNEY Patented Aug. 31, 1943

2,328,461

UNITED STATES PATENT OFFICE 2,328,461

CONTINUOUS RECORDER FOR COLOR CHANGES

Roy Herman Kienle, Bound Brook, Robert H. Park, Bridgewater Township, Somerset County, Charles H. Benbrook, North Plainfield, and Everett F. Grieb, Plainfield, N. J., assignors to American Cyanamid Company, New York, N. Y., a corporation of Maine Original application August 29, 1940, Serial No. 354,702. Divided and this application August 14, 1941, Serial No. 407,412

3 Claims. (Cl. 234—1.5)

This invention relates to devices for continuously recording changes in color in a reaction and more particularly to continuously record dyeing processes.

Many reactions are accompanied by a change in color among which dyeing procedures are perhaps the most common. It is important to determine how far a reaction has gone and in case of investigations on new or modified reactions, it is also important to follow the course of the reaction. Attempts to do this visually are not in the main satisfactory because no quantitative results are obtained due to the lack of analytical power of the eye. In the past, therefore, it has become increasingly the practice to examine samples of reaction mixtures in which a color change is taking place by putting the sample in a spectrophotometer, colorimeter, or other device capable of giving a measurement of color intensity either throughout the spectrum or at a given wave length. Such procedures, however, require the taking of a sample, putting the sample in the spectrophotometer or colorimeter, obtaining a reading and then taking another sample. The labor is very great if a large number of samples have to be taken and where changes are rapid as they are in some points in the reaction, the readings may occur at too long intervals to give a useful indication of color change. Many reactions also suffer from exposure to air which almost invariably occurs in sampling, viz., the leuco of a vat dye.

The present invention is dircted to a device and method for continuous measurement of color changes in any system where a colored component is available in fluid form. Essentially the present invention includes the combination with the reaction chamber of a device for continuously circulating a small but representative portion of a colored liquid component through a suitable cell where the transmission at a fixed color is continuously measured. The measurement is effected by a colorimeter of the photoelectric comparison type. In every case the rate of response of the system must be sufficiently rapid to insure readings which will give a correct picture of the change of color with time.

Where indications of changes in transmission at a definite wave length are desired and the device is used in conjunction with large scale or long continued operation with materials where the wave length of absorption does not change, the device may be permanently arranged, for example, a dye vat may be equipped with the present invention including a suitable colorimeter.

Throughout the present specification the term "reaction" or "reaction mixture" is used somewhat loosely. In some dyeing procedures there is an actual reaction of the dye with the material being dyed. In other cases the association may be physical. The result, however, is a change in total chemical composition of the bath so that there is a continuous chemical change which is manifested by changes in color, precisely as is the case in a reaction where there is an actual chemical change taking place by reacting one component with another. The optical measurement is of course, not concerned with the past history of the color change and the utility of the present invention is likewise not concerned with the underlying chemistry which produces the change in color. For this reason the terms "reaction" and "reaction mixture" in the specification and claims are used in a somewhat loose form to indicate a change in total chemical composition whether this results from a true chemical reaction or from a physical removal or addition of certain colored constituents.

While the optical instrument or rather the general type or principles of operation of the instruments form an integral part of the invention since they determine the nature of the measurement, the present invention is not concerned with details of construction of the optical instruments except insofar as these constructional details adapt them for measurement of the circulating liquids which are a feature of the present invention. In other words, the present invention is concerned with a combination of certain types of optical instruments operating on certain principles with other elements of the finished device or method and is not concerned with improvements in structural details such as lenses, light sources, and the like. It is an advantage of the present invention that standard parts may to a large extent be used in the optical portion of the apparatus so that it is not necessary to obtain special optics with correspondingly increased price. It is also possible to take standard optical instruments and with only minor structural changes incorporate them in the present invention which permits the utilization of suitable colorimeters which are already owned, or permits obtaining the optical parts of the apparatus in standard form. This is an important advantage as there are few concerns equipped to design and build complicated optical apparatus and the possibility of utilizing other types of equipment makes the present invention more generally available.

The present invention is useful not only in the visible portion of the spectrum but throughout the whole zone of optical radiation, that is to say, radiations that are capable of being concentrated by optical means and hence includes infrared and ultraviolet. The internal constructions of a colorimeter for ultraviolet or infrared frequently have to be modified because of the nature of the radiation. However, the principles of the present invention apply in the same way, the only changes being in the colorimeter portion of the device and the cell. As the present invention has a particular use with measurements made in the visible spectrum, the specific description which follows will in the main be directed to this modification.

The invention will be described in greater detail in conjunction with the drawings in which:

Fig. 1 is an elevation partly in section and partly broken away of one modification of the present invention;

Fig. 2 is a detailed elevation partly broken away on a larger scale of the circulating device of Fig. 1;

Fig. 3 is a diagrammatic section of a device according to Fig. 1 inserted in a colorimetric circuit;

Fig. 4 is an enlarged diagrammatic illustration of the recording galvanometer of Fig. 3;

Fig. 5 is a typical record obtainable in the colorimeters of Figs. 1 and 4;

In the figures the same reference numerals will be used to designate the same functional parts.

Figure 6:
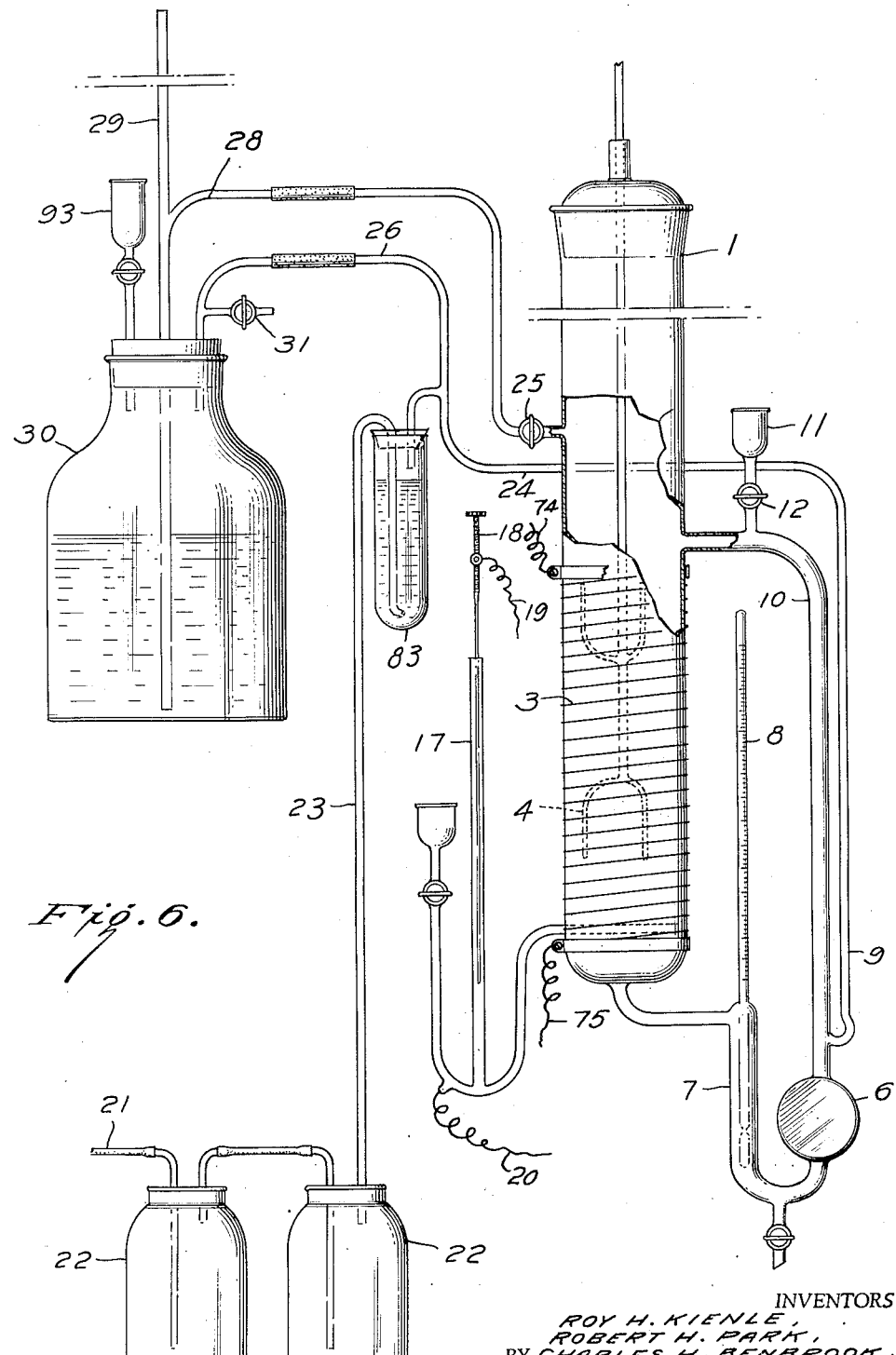
Fig. 6 is an elevation partly broken away of a somewhat modified circulating system according to the present invention.

The circulating device shown in Figs. 1, 2, and 3 consists of a reaction chamber 1 containing a reaction mixture mounted in a wooden framework 2, heating coil 3 connected to a heating relay 27 (Fig. 3) by wires 74 and 75, skein holder 4 given up and down oscillatory movements by a shaft 5 driven from any suitable source of power (not shown). The liquid from the reaction chamber flows downwardly into the thin transmission cell 6, thence into U tube 7, the left hand leg of which is provided with a thermometer 8 in a suitable well (not shown), and the enlarged right hand leg being provided with a mercury U tube 15. The U tube also contains toluene on top of the mercury because of its higher coefficient of expansion. An air lift consisting of gas passing through the pipe 9 with restricted opening circulates liquid from the right hand leg of the U tube up to the pipe 10, and back into the reaction chamber. The rate of circulation is determined by the amount of gas introduced in the air lift and can be adjusted to suit particular conditions.

The apparatus may be filled through a suitable filler 11 connected to the tube 10 through the stop cock 12 and the apparatus can be drained through stop cock 32 at the bottom of the U tube. The temperature can be maintained constant by means of a mercury U tube 15 in which the right hand column of mercury 16 is connected at the bottom to wire 20 and at the top approaches an electrode 17 which is adjustable by the narrow threaded shaft 18 and leads to a wire 19 which, with wire 20, connect to relay 27 which takes power from the main power line 33 and connects to the heating coil 3 through the wires 74 and 75. The relay 27 is of conventional design, its structure having no bearing on the present invention. The relay controls in convenient manner the electrical current reaching coil 3 and thus maintains the temperature constant at any predetermined figure. In order to heat the apparatus to any desired operating temperature the stop cock 14 is opened whereupon the mercury in the fine tube 16 drops to essentially the same level as that in cup 13, and during the subsequent heating, rises only slightly because the major part of the mercury which is expelled from tube 15 by the expansion of the liquids (toluene and mercury) therein, enters cup 13 because of its greater cross sectional area as compared with that of tube 16. When the desired operating temperature has been almost reached, the stop cock 14 is closed whereupon all subsequent expansion of the liquids forces mercury into the fine tube 16 until the mercury column therein touches the electrode 17 whereupon the current to coil 3 is turned off by the relay 27 and cooling of the system occurs until the connection with electrode 17 is broken by contraction of the liquids in the tube 15. The relay 27 then reconnects the current to coil 3 through the wires 74 and 75. Thus, the temperature fluctuates over only a very narrow range. The final setting at the desired temperature is accomplished by raising or lowering the metal shaft 18 to which is attached the electrode 17.

In operation, cell 6 is placed in optical alignment in a comparison colorimeter which is shown diagrammatically in Fig. 3. The drawings are purely diagrammatic and in practice, of course, the optical system contains suitable light tight chambers. A projection lamp 34 is fed from a storage battery 35 or other source of constant voltage. The beams pass out from the filament of this lamp onto a pair of condensing lenses 36. The transmission cell 6 of Fig. 1 is interposed in one of these beams. This cell is relatively thin, providing a very thin film of circulating liquid, for example, the plates forming the two sides of the cell may be about 0.3 cm. apart. The beam passing through the cell 6 and lens 36 is further condensed by means of lens 38 and passes through a filter 40 to phototube 42. The other beam passes through a similar filter 39, diaphragm 37 to another phototube 41. The diaphragm 37 serves for adjustment of one of the beams so that the galvanometer reading from the phototube 41 corresponds to that from 42 when a medium of complete transparency flows through cell 6. The filters may be advantageously double as shown. While the present invention does not require critical matching of the two filters as adjustment over a reasonably wide range is possible by means of the diaphragm 37, it is desirable to use filters 39 and 40 which match closely as the apparatus will then read with greater accuracy and adjustment is simpler. The filters can, of course, be rapidly changed to obtain measurements at any desired color.

Phototube 41 is connected by wires 43 and 44 to one set of contacts 45 and 46 of a double throw switch, while phototube 42 is connected by wires 47 and 48 to the other set of contacts 49 and 50 of the same switch. The center contacts 51 and 52 are in series with a suitable source of direct current voltage 53, shown diagrammatically as a battery, and a recording galvanometer 54, the details of which are shown in Fig. 4. The switch arm 56 of the double throw switch is operated by a solenoid 55 which is connected through wires 57 and 58 in series through an interval timer 60 to a transformer 59 which is connected to a 110 v. supply line 33. This same line connects through wires 61 and 62 to the timing mechanism of the interval timer 60. This timer is of standard design and as is illustrated in the drawings is adjusted to open the solenoid circuit for 30 seconds and then to close it for the same period. This interval is very satisfactory for photographic recording when using a critically damped galvanometer of short period, but any other intervals can be used which are desired.

Wires 64 and 65 lead from the supply line to another interval timer 63 which is adjusted to close a switch in the filament circuit of the lamp 34 for four minutes and leave it open for one minute. The galvanometer is of standard type critically damped with optical magnification. The lens 67 (Fig. 4) is of such focal length as to focus perfectly on the drum 70 an image of the filament of the source 66. The source 66 may be an incandescent lamp with a single vertical filament which lamp is enclosed in a light-tight housing provided with a vertical slit only wide enough to allow light from the filament to impinge the entire surface of the lens 67. The drum is likewise provided with a light-tight housing in which is a very fine horizontal slit parallel to the axis of the drum and very close to the drum so that the image of the long lamp filament is reduced to virtually a point of light when it impinges the drum which rotates very slowly by means of the constant speed motor 69 and the gear train 71, and which drum may be covered with a suitable photographic paper such as a contrast bromide paper, by which arrangement a spot is recorded on the photographic paper whenever the galvanometer mirror is stationary for a sufficiently long period of time, say 30 seconds.

Fig. 5 shows a record obtained with the device shown in Figs. 1 and 4 when the reaction mixture in the chamber is a dyebath. It will be noted that there is a lower line of dots 72 which correspond to the reading when the galvanometer is switched every 30 seconds onto phototube 41. Fluctuations in the level of this line of dots are due to the slight changes in intensity of radiation of the lamp 34 or other factors in the electrical system. It is an advantage of the present invention that within reasonable limits such fluctuations do not adversely affect the accuracy of the device. The line of dots 73 corresponds to records of the galvanometer during the periods when the interval timer 60 has switched the galvanometer onto the phototube 42. It will be noted that the start which is portrayed at the left of the record, transmission is very low at the chosen wavelength, but as the dyeing proceeds the amount of dye remaining in the bath is gradually decreased and the transmission steadily increases. In order to establish a base line from which to measure the galvanometer deflection, the lamp 34 is extinguished for 60 seconds periodically by the interval timer 63, as described above, during which 60 second interval the dark currents for phototubes 42 and 41 are successively recorded, giving rise to the rows of dots 86 and 87, which correspond to a dark current for the two phototubes by which the actual deflection can be determined by measuring the distance from these dots to the dots on the other two lines. It will be noticed that the line of dots 72 is not quite level but shows a gradual rise, probably due to the discharge of battery 35. Also the lines of dots 86 and 87 are not level as a result of the drifting of the galvanometer rest position—a common occurrence in sensitive galvanometers. A record in which these changes are rather large was purposely chosen in order to illustrate this feature of the invention. Even with a considerable change, the actual absorption at all times in the cell 6 can be accurately measured since the discrepancies apparent in dots 73 may be removed by properly applying the measurements of dots 72, 86 and 87 as corrections. This is of great importance as the system is not at the mercy of fluctuations in light which makes it unnecessary to employ extraordinary means to keep the intensity of the source exactly constant, and permits very rugged and simple colorimeter construction. Furthermore, no error results from galvanometer drift or from changes in electrical leakage or dark current during an experiment. This is one of the advantages of the modification of this invention in that it can be adapted for rough use, for example, in dyeing factories, the cell 6 being connected to a large dyeing vat. The figures in the drawings show a laboratory type of machine, but of course the invention is not in any way affected by a change in the shape or size of the reaction chamber and in any dye application this may be a large dye vat or other dyebath container. The size of the container is immaterial so long as a representative sample is being continuously circulated through the cell 6. In the laboratory device shown in Fig. 1, the circuit is closed, that is to say, the liquid after passing through the cell 6 is returned by air lift to the reaction vessel. This is necessary in a laboratory set-up where the reaction vessel is relatively small. In the case of large dyebaths, the amount withdrawn to the cell is so small that in some cases it is not worthwhile to recirculate the sample and if desired the slight trickle to the cell may be permitted to go to waste. The operation of the rest of the device is not of course in any way affected by this modification.

Fig. 6 shows a slightly different form of laboratory reaction vessel in which the cell is offset to one side and the mercury U-tube is placed on the other side. This figure also shows an automatic means for filling the device without subjecting the liquid to contact with the air. This is effected by using the gas which is employed for circulation in the air lift to pump in liquid to fill the reaction chamber. The gas is shown as coming from a suitable pressure tank or pump through the pipe 21 and a couple of wash bottles 22 up through the pipe 23 into a gas moistening chamber 83 and thence to the air lift through pipe 24. Pipe 26 leads to the reservoir 30. Liquid from the reservoir rises in the tube 29 and the height of the liquid column serves to measure the pressure under which the gas is flowing into the air lift. The reservoir may be filled through 93. Liquid may be transferred from the reservoir to the reaction vessel by opening stop cock 25 and pressure within the system may be released by opening stop cock 31. Change in dilution of the reaction solution is prevented by pumping the gas used in the lift through a body of the same liquid used in the reaction chamber (usually water) in the vessel 83. Pumping of the gas results from the fact that pipe 21 connects to a pressure tank in which the gas used is maintained at a sufficient pressure to produce the desired flow. As a result the gas used in the air lift is saturated with moisture at the elevated temperature and no loss from the reaction chamber will take place. The operation of the modified reaction chamber and circulating system shown in Fig. 6 is otherwise exactly the same as that in Fig. 1.

This application is a division of our copending application Serial No. 354,702, filed August 29, 1940.

We claim:

1. A device for measuring changes of absorption of optical radiation in a reaction which comprises in combination a transparent cell, means for continuously circulating a small portion of liquid through said cell, a source of light, means for producing two beams from said source of light, radiation detecting means in each of said beams capable of transforming radiant energy received into electric energy, means for causing radiant energy of predetermined frequency range only to strike the two detecting means, the frequency range being the same for each beam, said transparent cell being located in one of said beams, a recording galvanometer and means for alternating recording by the galvanometer current from the radiation detecting means from each beam.

2. A device for measuring changes of absorption of optical radiation in a reaction which comprises in combination a transparent cell, means for circulating liquid through said cell, a source of light, a plurality of lenses producing two beams from said source of light, said cell being in optical alignment with one of said beams, means for causing each beam to consist of the same predetermined frequency range of radiation, radiation detecting means for each of said beams capable of transforming radiant energy received into electrical energy, a recording galvanometer, means for alternately recording by the galvanometer the current from the radiation detecting means in each beam and means for periodically extinguishing the beams through a cycle in which the dark current of each radiation detecting means will be recorded.

3. A device according to claim 2 in which the galvanometer is of the mirror type reflecting a beam of light and said beam of light is caused to impinge on a slowly moving surface capable of photographically recording the reflected beam from the galvanometer as a series of dots.

ROY HERMAN KIENLE.
ROBERT H. PARK.
CHARLES H. BENBROOK.
EVERETT F. GRIEB.